(12) United States Patent
Liu

(10) Patent No.: US 11,814,149 B2
(45) Date of Patent: Nov. 14, 2023

(54) MULTIFUNCTIONAL UNDERWATER PROPELLER

(71) Applicant: JIANGSU YOUMAY ELECTRIC APPLIANCE CO., LTD., Jiangsu (CN)

(72) Inventor: Ying'an Liu, Huaian (CN)

(73) Assignee: JIANGSU YOUMAY ELECTRIC APPLIANCE CO., LTD., Jiangsu (CN)

( * ) Notice: Subject to any disclaimer, the term of this patent is extended or adjusted under 35 U.S.C. 154(b) by 0 days.

(21) Appl. No.: 17/946,517

(22) Filed: Sep. 16, 2022

(65) Prior Publication Data

US 2023/0097292 A1 Mar. 30, 2023

(30) Foreign Application Priority Data

Sep. 25, 2021 (CN) .......................... 202122329239.1

(51) Int. Cl.
*B63H 1/20* (2006.01)
(52) U.S. Cl.
CPC ..................................... *B63H 1/20* (2013.01)
(58) Field of Classification Search
CPC ......... B63B 11/02; B63B 11/46; B63B 32/10; B63B 32/66; B63B 32/70; B63B 32/77; B63B 34/10; B63B 2221/20–24
See application file for complete search history.

(56) References Cited

U.S. PATENT DOCUMENTS

| 4,996,938 | A | * | 3/1991 | Cameron | A63B 35/12 |
| | | | | | 440/6 |
| 7,207,282 | B1 | * | 4/2007 | Ruan | B63C 11/46 |
| | | | | | 441/74 |
| 10,300,998 | B2 | * | 5/2019 | Terada | B63H 21/17 |
| 10,960,269 | B1 | * | 3/2021 | Lu | B63H 23/02 |
| 11,459,068 | B2 | * | 10/2022 | Ostanin | B63B 32/10 |
| 2021/0163105 | A1 | * | 6/2021 | Lu | B63C 11/02 |
| 2022/0315174 | A1 | * | 10/2022 | Sewell | H02J 7/0045 |
| 2023/0025105 | A1 | * | 1/2023 | Ostanin | B63B 32/60 |
| 2023/0159143 | A1 | * | 5/2023 | Wei | B63C 11/02 |
| | | | | | 114/337 |

FOREIGN PATENT DOCUMENTS

CN 217945458 U * 12/2022

* cited by examiner

*Primary Examiner* — Brian P Wolcott
(74) *Attorney, Agent, or Firm* — COOPER LEGAL GROUP, LLC

(57) ABSTRACT

The present application relates to the field of underwater propeller, and more particular, to a multifunctional underwater propeller, which includes a propeller body. The propeller body is detachably connected with a handle, and a surface of the propeller body is connected with an adapter structure for detachably connecting external equipment. The adapter structure includes a connecting piece and a slide rail, and the connecting piece is in plug-in connection with the slide rail, and configured for detachably connecting the external equipment.

9 Claims, 12 Drawing Sheets

A

B-B

C

MULTIFUNCTIONAL UNDERWATER PROPELLER

CROSS-REFERENCE TO RELATED APPLICATION

This application claims the priority and benefit of Chinese patent application serial no. 202122329239.1, filed on Sep. 25, 2021. The entirety of Chinese patent application serial no. 202122329239.1 is hereby incorporated by reference herein and made a part of this specification.

FIELD OF THE INVENTION

The present application relates to the field of underwater propeller, and more particular, to a multifunctional underwater propeller.

BACKGROUND OF THE INVENTION

An underwater propeller is a device that can provide power underwater, which is commonly used by a user during moving under water.

However, with the development of science and the technology and the improvement of the living standard, it is found that, the existing underwater propellers can only be used for moving under water, failing to meet the requirements of current use, since they are single in terms of function and narrow in terms of scope of application.

SUMMARY OF THE INVENTION

To increase a use versatility and scope of a underwater propeller, the present application provides a multifunctional underwater propeller.

The multifunctional underwater propeller provided in the present application adopts the following technical solution:

A multifunctional underwater propeller including a propeller body, in which the propeller body is detachably connected with a handle, and a side wall of the propeller body is connected with an adapter structure for detachably connecting external equipment; the adapter structure includes a connecting piece and a slide rail fixed on a surface of the propeller body, and the connecting piece is in plug-in connection with the slide rail, and configured for detachably connecting the external equipment.

In the above technical solution, when using the propeller body alone to dive, the user can move under water by holding the handle. For exploring the underwater environment, the external equipment, for example, a photographing device, can be connected to the surface of the propeller body via the adapter structure, thus the underwater conditions can be photographed and explored. Alternatively, the external equipment can be a sliding device connected to the surface of the propeller body via the adapter structure, and the propeller body supplies power to the sliding device, so that the user can slide on the water for fun. Providing the adapter structure facilitates connecting a plurality of external equipment to the surface of the propeller body, so as to meet a wide variety of use requirements of the user, widening the use scope of the propeller body.

In some embodiments, the connecting piece includes a connecting block and a first insertion plate fixed to one end of the connecting block, the first insertion plate is fixed to an inner cavity of the slide rail by plug-in connection, and the other end of the connecting block is configured for detachably connecting the external equipment.

In the above technical solution, when the external equipment is connected to the propeller body, the first insertion plate is inserted in an inner cavity of the slide rail to abut against the slide rail and avoid disengaging, the other end of the connecting block is fixed with the external equipment by means of detachable connection. The detachable connection can be plug-in connection, bolt fixing, hinging, and so on.

In some embodiments, the first insertion plate is threadedly connected with a locking bolt, and the locking bolt is threadedly connected with an outer wall of the propeller body.

In the above technical solution, after inserting the first insertion plate to the inner cavity of the slide rail, the connecting stability between the first insertion plate and the slide rail is improved by an additional fixing of the locking bolt.

In some embodiments, when the external equipment is fixed with the connecting block by plug-in connection, a connecting groove is provided at one side of the external equipment, a second insertion plate is fixed at one end of the connecting block away from the propeller body, the second insertion plate is slidingly movable in the connecting groove, and a snap-connection assembly is provided at one end of the connecting block away from the propeller body by pressing to snap in for driving the second insertion plate to be fixed in the connecting groove.

In the above technical solution, the external equipment here is optionally a surfboard. The connecting groove is provided on the surfboard in advance, and the second insertion plate is inserted in the connecting groove, and restricted from sliding in the connecting groove by the snap-connection assembly, realizing a connection between the external surfboard and the propeller body, and improving the connecting stability between the external equipment and the propeller body.

In some embodiments, the snap-connection assembly includes two abutting blocks respectively arranged on two sides of the connecting block and a spring arranged between the two abutting blocks, a limit hole for accommodating the two abutting blocks is provided penetrating through a side wall of the connecting block, and the two abutting blocks are respectively slidingly connected at two ends of the limit hole, a snap-in groove is defined in a side wall of the connecting groove and in communication with an inner cavity of the connecting groove, and the abutting blocks abuts against an inner wall of the snap-in groove.

In the above technical solution, a degree of freedom of the second slide plate sliding along the length direction of the connecting groove is limited by the snap-connection groove, so that the connecting stability between the connecting block and the external equipment is improved. When the connecting block is fixed on the external equipment, the abutting block is firstly pressed to compress the spring so that the abutting block is slid into the limit hole. Then one end of the connecting block away from the propeller body is inserted in the connecting groove of the external equipment and the whole connecting block is slid until the abutting block is exactly aligned with the snap-connection groove of the external equipment. Then the abutting block is loosened, and the abutting block abuts against the inner wall of the snap-connection groove under a restoring force of the spring, thereby realizing the relative fixing of the connecting block and the external equipment.

In some embodiments, when the connecting block is a hinge, a connecting plate is fixed on a side wall of the external equipment, and one end of the connecting block away from the propeller body is hinged with the connecting plate.

In the above technical solution, the external equipment here is optionally a camera. The connecting plate is fixed to an outer wall of the camera by means of bonding or bolt fixing in advance, then the connecting plate is rotatably connected to the connecting block by means of pin connection. Therefore, during diving using the propeller body, the camera can be used for photographing underwater remains or organisms.

In some embodiments, the propeller body includes a circuit board, a drive motor electrically connected to the circuit board, and a spiral blade coaxially fixed on a rotating shaft of the drive motor, the handle is provided with a button for controlling start and stop of the drive motor, and the button is electrically connected with the circuit board.

In the above technical solution, for starting the propeller body to move underwater, the button on the handle is pressed so that the battery in the propeller body supplies power to the drive motor that drives the spiral blade to rotate, thereby realizing the moving underwater of the propeller body.

In some embodiments, one end of the handle is provided with an outwardly protruded snap rib, an outer side of the propeller body is provided with a snap-in groove cooperating with the snap rib to connect the propeller body with the handle, one of the propeller body and the handle is connected with a limit mechanism, and the other is provided with a limit mechanism to force the snap rib to engage with the limit groove of the snap-in groove; and the limit mechanism includes an insert block matching with the limit groove and a telescopic assembly driving the insert block to be inserted into or separated from the limit groove.

In the above technical solution, the defect of frequent slipping in threaded connection is overcome by adopting snap connection. In addition, after the snap connection of the snap rib and the snap-in groove within the handle and the propeller body, the limitation action of the limit mechanism and the limit groove makes the snap connection of the snap rib more stable.

In some embodiments, the limit mechanism further includes a cover plate fixed on the propeller body or the handle provided with the limit mechanism;

the cover plate is provided with a guide hole for one side of the insert block to pass through, and an outer peripheral surface of the other side of the insert block is convexly provided with a limit slider for restricting the insert block from disengaging from the guide hole;

the telescopic assembly includes a telescopic member forcing the insert block to pass through the guide hole and an unlocking member forcing the insert block to retract into the guide hole; and one end of the telescopic member abuts against the insert block, and the other end abuts against the propeller body or the handle;

the unlocking member is positioned between the cover plate and the propeller body or the handle provided with the limit mechanism; and the unlocking member includes an unlocking part, a first abutting part and a second abutting part, the first abutting part and the second abutting part are controlled by the unlocking part to abut against the limit slider alternatively, and a first distance between the limit slider and the cover plate when the first abutting part abuts against the limit slider is larger than a second distance between the limit slider and the cover plate when the second abutting part abuts against the limit slider.

In the above technical solution, a reciprocating movement of the limit slider between the cover plate and the handle controlled by the unlocking member and the telescopic member coordination changes the distance between the limit slider and the cover plate, so that the end of the insert block away from limit slider is driven to retract into or protrude out of the guide hole.

In some embodiments, the unlocking part is located at one side of the unlocking member, and the handle is provided with an unlocking hole for the unlocking part to pass through; the second abutting part is positioned on the other side of the unlocking part, and the first abutting part is positioned between the second abutting part and the unlocking part; and one side of the first abutting part and one side of the second abutting part abutting against the limit slider constitutes an unlocking slope by a smooth connection, and the unlock slope is tilted from the first abutting part to the second abutting part and from the limit slider to the cover plate; and the limit slide is provided with a slide slope for abutting against the unlocking slope, and a length of the unlocking slope along a tilting direction is larger than a length of the slider slope along the tilting direction.

In the above technical solution, a wedge mechanism formed by the cooperation of the limit slider, the unlocking member and the telescopic member enables the unlocking member to control the limit slider to move with the insert block in a direction different from the axial direction of the guide hole, while enabling the unlocking member to be restored quickly under the action of the limit slider and the telescopic member.

In summary, the present application can achieve at least one of the following beneficial technical effects.

1. The propeller body can be used for moving under water alone or combined with an external surfboard or camera, increasing a use versatility of the propeller body.

2. The limitation action of the limit mechanism and the limit groove in addition to the snap connection between the snap rib and the snap-in groove can snap connect the snap rib in the snap-in groove more stably.

3. The above connecting structure enables the handle to be quickly and efficiently connected to the propeller body.

DESCRIPTION OF THE PREFERRED EMBODIMENTS

The present application will be further described in detail with reference to FIG. 1-12.

Embodiment 1

A multifunctional underwater propeller is disclosed in the present application.

Figure 1:
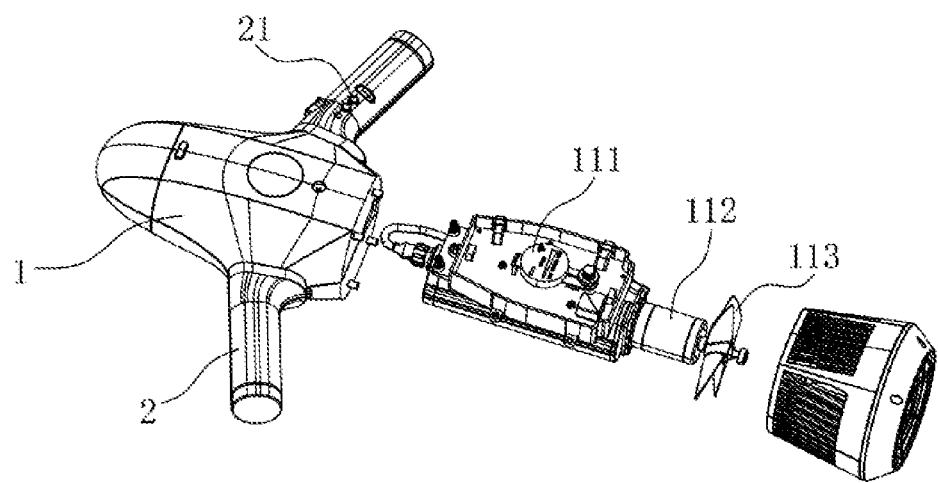
FIG. 1 is an exploded view of Embodiment 1 of the present application.

Referring to FIG. 1, a multifunctional underwater propeller includes a propeller body 1 and a handle 2 detachably connected to opposite sides of the propeller body. The propeller body 1 includes a circuit board 111, a drive motor 112, and a spiral blade 113 installed in the propeller body 1. A motor shaft of the drive motor 12 is coaxially fixed to spiral blade 113, and the circuit board 111 is electrically connected to the drive motor 112. There are two handles 2, a side wall of one of the handles 2 is provided with a button 21, the button 21 is connected in series with the circuit board 111 and the battery in the propeller body 1, the button 21 is configured to control the rotation of the rotating shaft of the drive motor 112, so as to control the rotation of the spiral blade 113.

Figure 2:
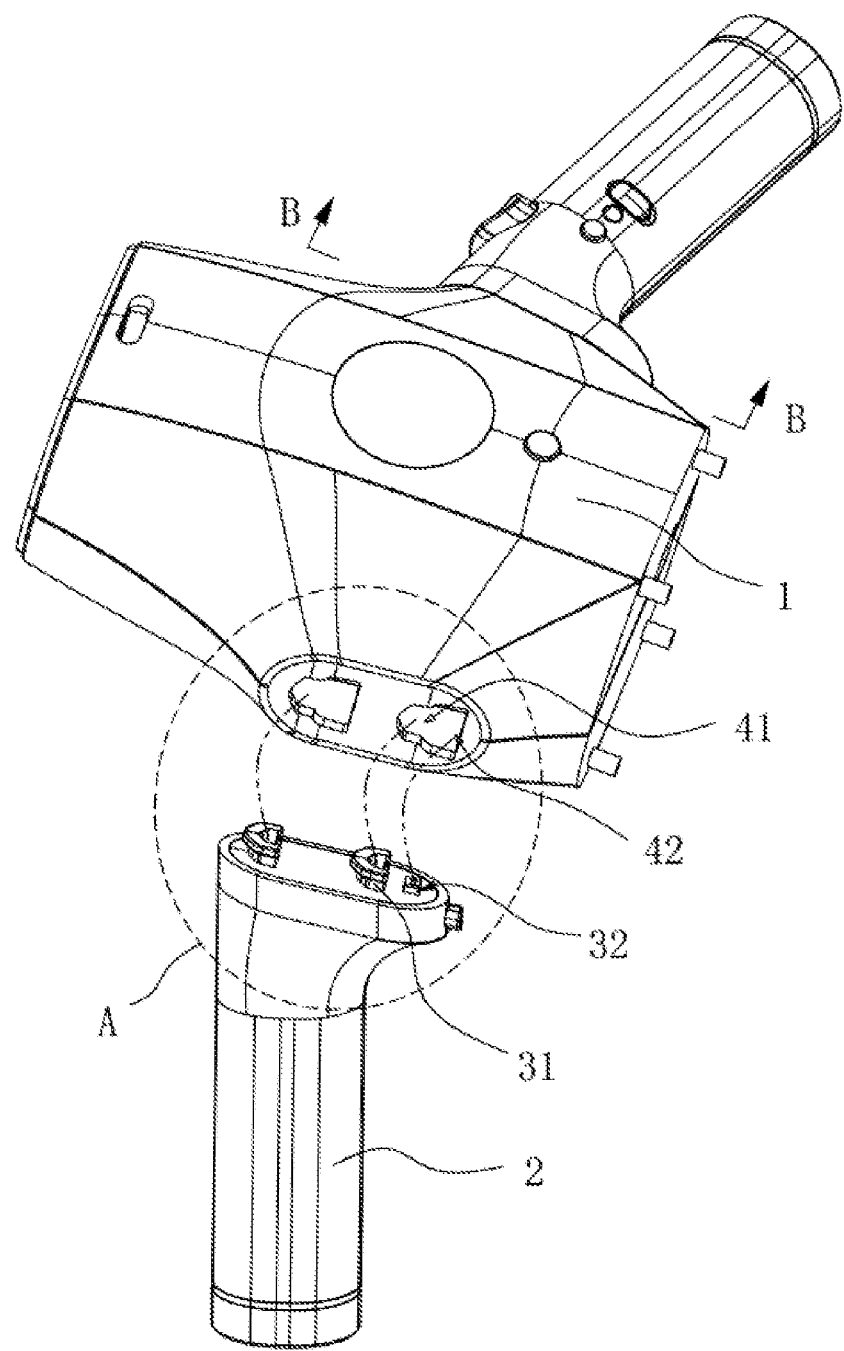
FIG. 2 is an exploded schematic diagram of a propeller body and a handle in Embodiment 1 of the present application.

Referring to FIG. 2, one side of the handle 2 is provided with an outwardly protruded snap rib 31, and one side of the propeller body is provided with a snap-in groove cooperating with the snap rib.

Figure 3:
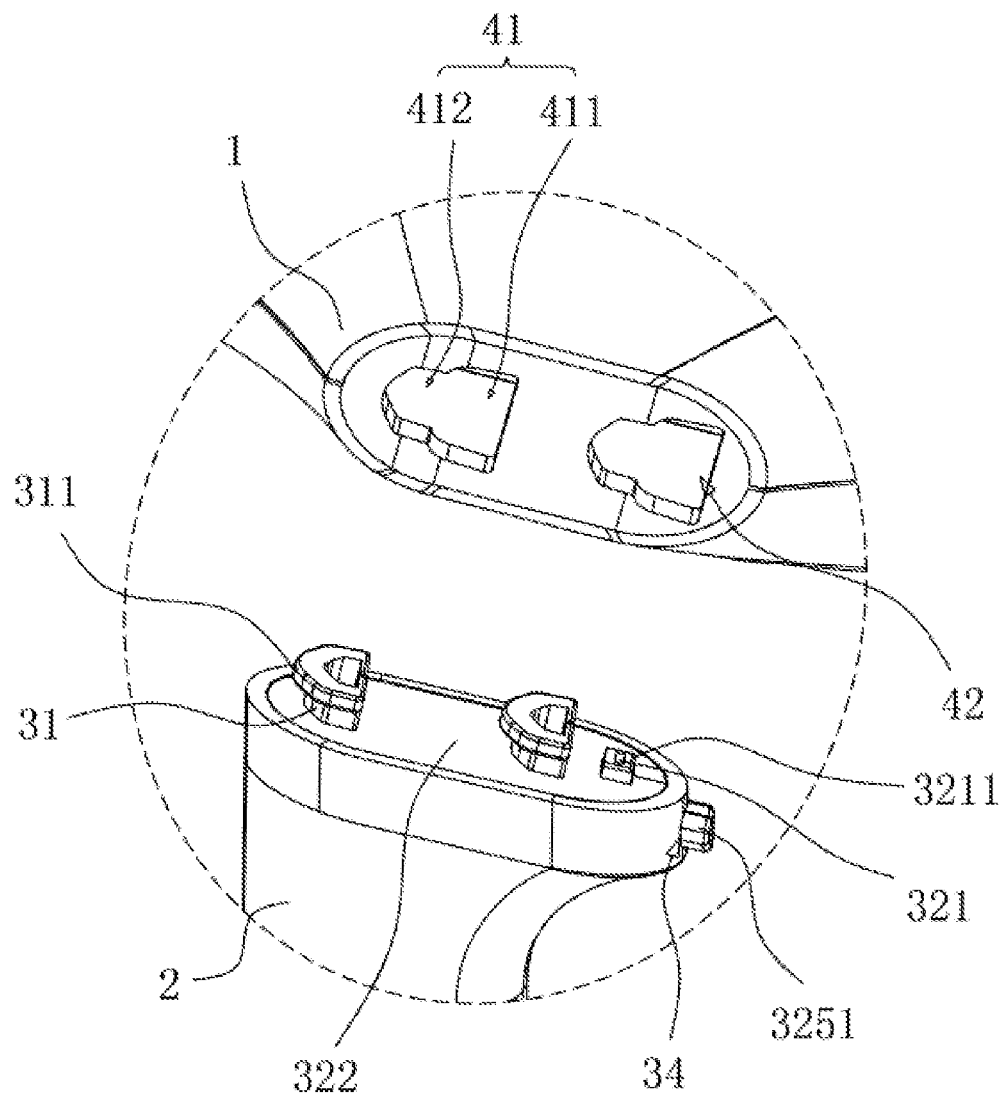
FIG. 3 is an enlarged schematic diagram of Portion A in FIG. 2, mainly showing the shape, structure and position of the snap rib and the snap-in groove.

Referring to FIG. 3, a flange 311 is provided along a periphery of one end of the snap rib 31 away from the handle 2, that is, a diameter of the snap rib 31 is smaller than an outer diameter of the flange.

Referring to FIG. 3, the snap-in groove 41 includes a accommodation groove portion 411 and a snap-in groove portion 412, and the snap-in groove portion 412 is located at one side of the accommodation groove portion 411. The accommodation groove portion 411 matches with a flange 311, and the accommodation groove portion 411 is configured for the flange 311 to pass through. The snap-in groove portion 412 matches with the snap rib 31, and is configured to restrict the flange 311 from disengaging from the snap-in groove 41. In the embodiment, the snap-in groove 41 is a through groove penetrating through a housing of the propeller body 1.

For installing the propeller body 1 and handle 2, the flange 311 and the snap rib 31 are firstly inserted into the snap-in groove 41 via the accommodation groove 411, and then the flange 311 is kept moving toward the snap-in groove portion 412; and then the propeller body 1 or the handle 2 is controlled to drive the snap rib 31 to move from the accommodation groove portion 411 to the snap-in groove portion 412, so that the flange 311 is snap connected to the side wall of the housing of the propeller body 1. For separating the handle 2 from the propeller body 1, the propeller body 1 or the handle 2 is controlled to drive the snap rib 31 to move from the snap-in groove portion 412 to the accommodation groove portion 411, and disengaged the flange 311 and the snap rib 31 from the snap-in groove 41 until the propeller body 1 and the handle 2 are separated from each other.

Referring to FIG. 2 and FIG. 3, one side of the propeller body 1 is provided with at least two snap-in grooves 41, and all of the accommodation groove portions 411 are located at a same side of the snap-in groove portion 412. The handle 2 is provided with the snap ribs 31 having the same number as that of the snap-in grooves 41. Therefore, the connection of the propeller body 1 with the handle 2 is made more stable.

Referring to FIG. 2, in order to snap connect the flange 311 and the snap rib 31 stably to the snap-in groove 41 and in turn the propeller body 1, a limit mechanism 32 and a limit groove 42 used in cooperation can be added between the handle 2 and the propeller body 1. The limit mechanism 32 is in plug-in connection with the limit groove 42, so that the snap rib 31 is snap connected with the snap-in groove 41 more stably. In this embodiment, the limit groove 42 is located on one side of the propeller body 1, and the limit mechanism 32 is located at one end of the handle 2.

Referring to FIG. 2 and FIG. 3, in this embodiment, the limit groove 42 is overlapped with one of the snap-in groove 41, thereby reducing the opening machining of the propeller body 1. The limit groove 42 is located at one side of the accommodation groove portion 411 away from the snap-in groove portion 412 in the same snap-in groove 41, so that the limit mechanism 32 abuts exactly against one side of the snap-in groove portion 412 away from the snap-in groove portion 412 when the snap rib 31 abuts against the snap-in groove portion 412.

Figure 4:
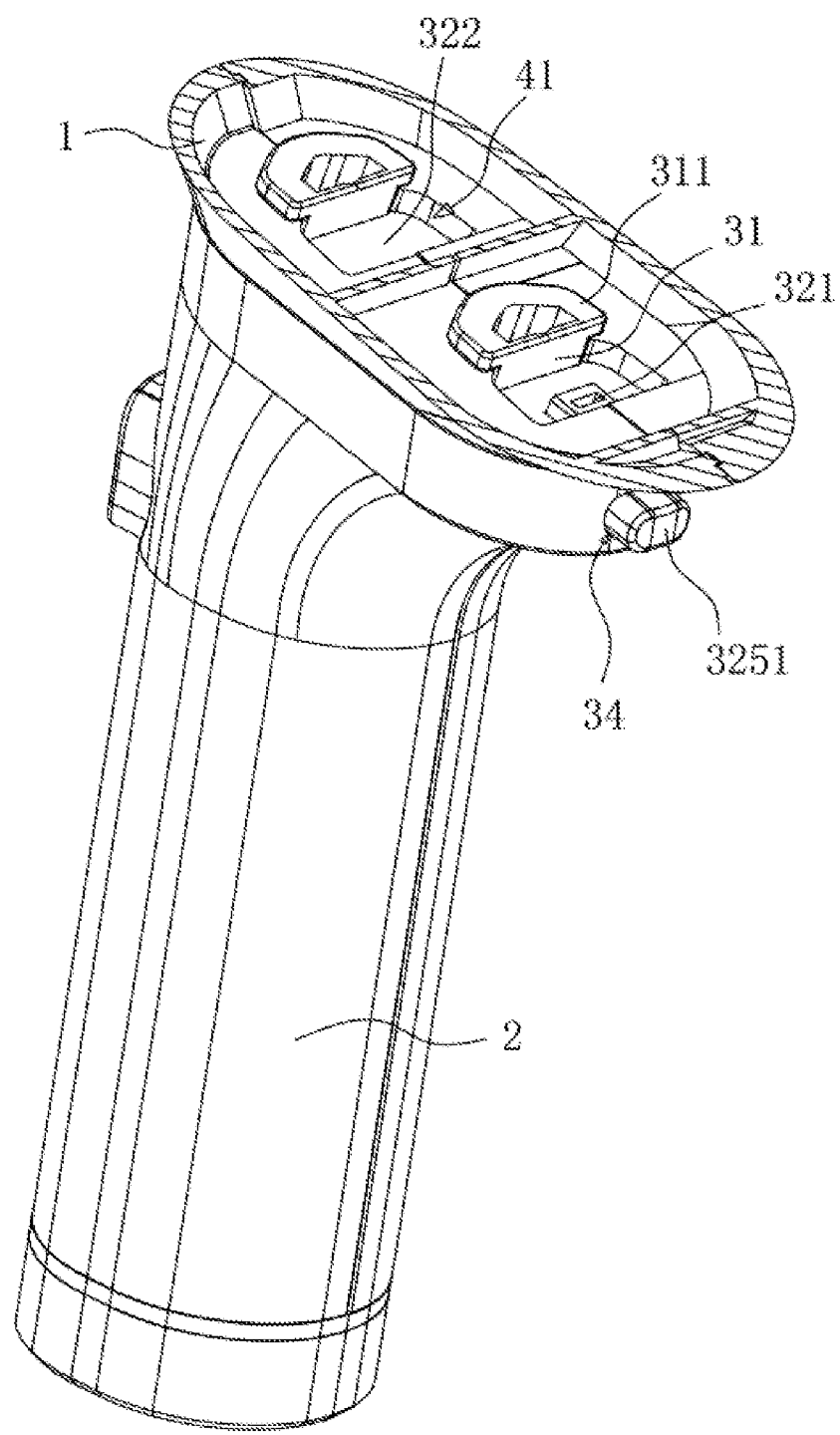
FIG. 4 is schematic diagram of the section along the line B-B in FIG. 2.
Figure 5:
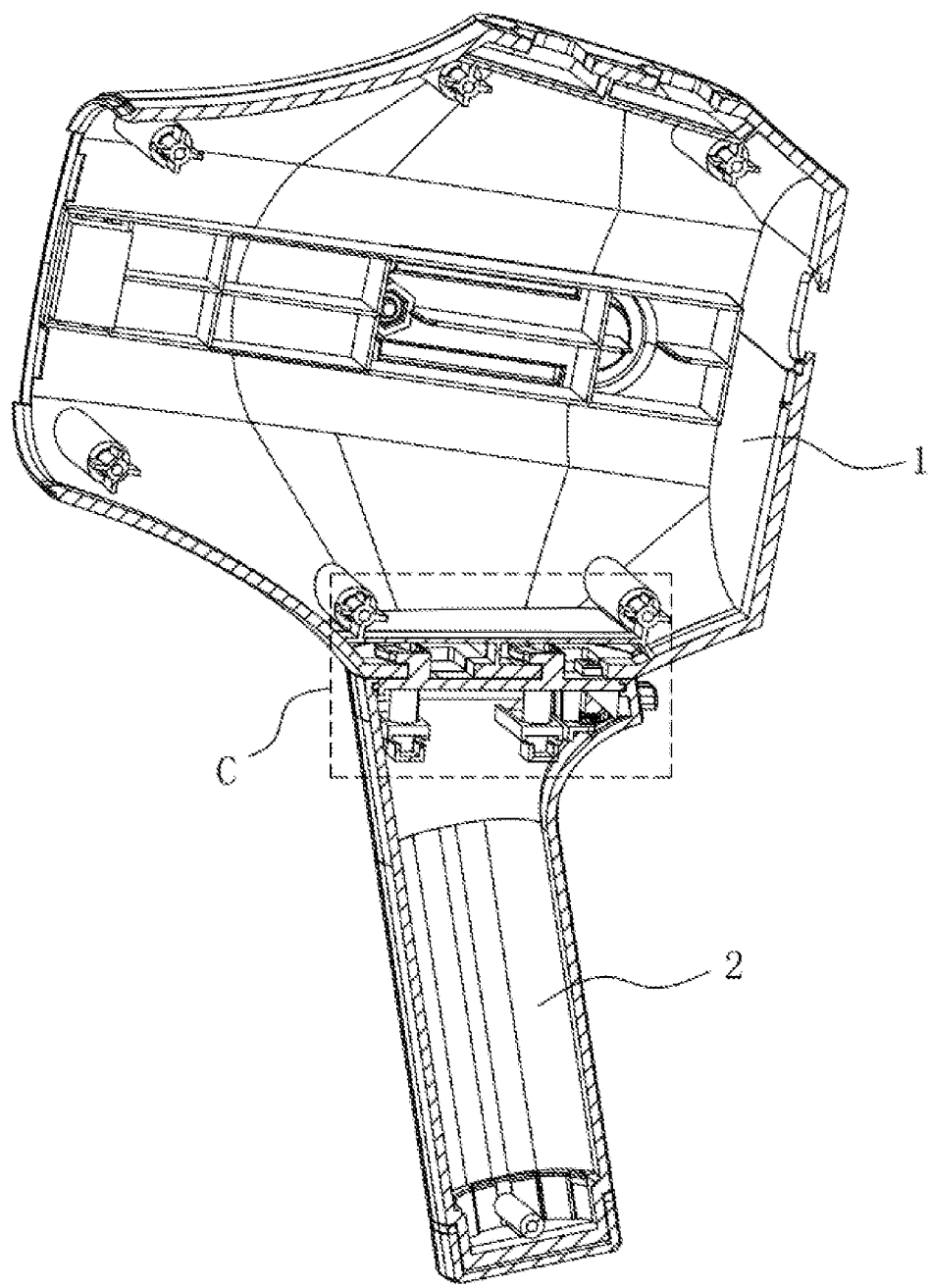
FIG. 5 is a schematic cross-sectional view of the propeller body and the handle in Embodiment 1 of the present application.
Figure 6:
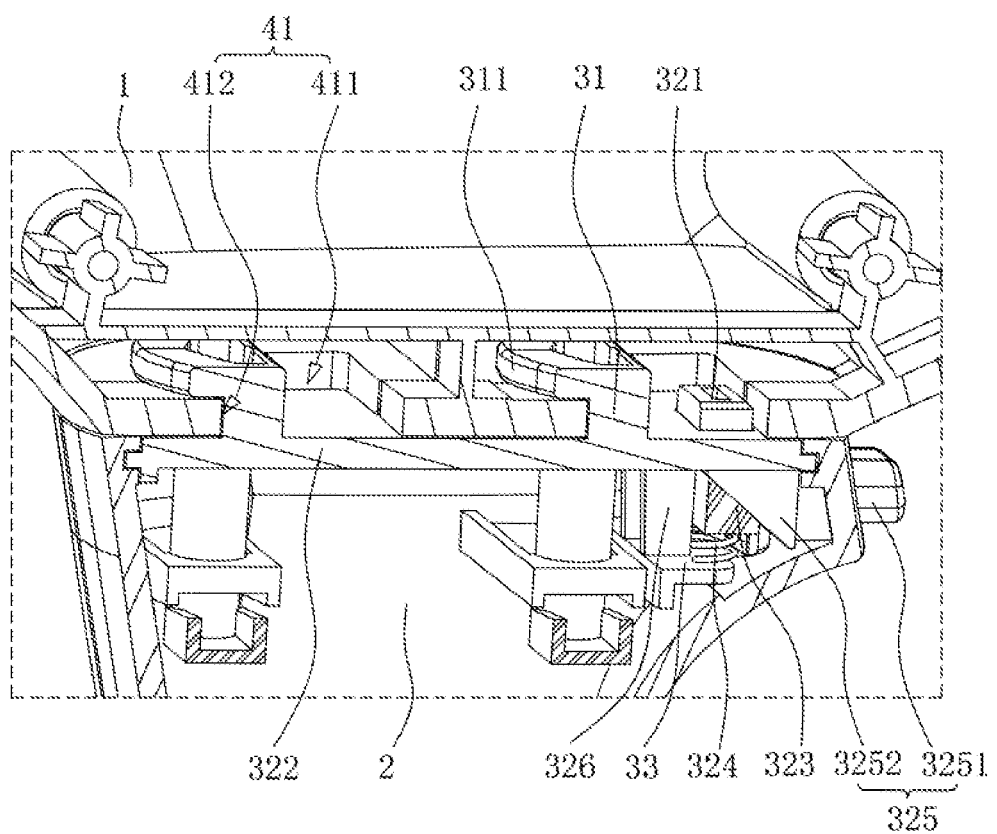
FIG. 6 is an enlarged schematic diagram of Portion C in FIG. 5.

Referring to FIGS. 4-6, the limit mechanism 32 include a insert block 321, a telescopic assembly and a cover plate 322.

The cover plate 322 is fixed at one side of the handle 2 configured to connect to the propeller body 1. The snap rib 31 is fixed at one side of the cover plate 322 opposite to the handle 2.

The cover plate 322 is provided with a guide hole 3221, the guide hole 3221 is located at one side of the snap rib 31. The insert block 321 matches with and penetrates through the guide hole 3221, one end of the insert block 321 away from the snap rib 31 is provided with a limit slider 323, which is figured to restrict the insert block 321 from disengaging from the guide hole along a side of the cover plate 322 provided with the snap rib 31. In this embodiment, there are two symmetrically arranged limit sliders 323, by which the insert block 321 can be more stably snap connected in the limit groove 42. A side of the insert block 321 away from the limit sliders 323 is provided with a guide plane 3211, which enable the insert block 321 to be quickly inserted into the limit groove 42.

Referring to FIG. 5 and FIG. 6, the side of the insert block 321 away from the limit sliders 323 can be driven to penetrate through the guide hole 3221 by the telescopic assembly, and exposed to a side of the cover plate 322 where the snap rib 31 is provided. When an end of the handle 2 abuts against a side of the propeller body 1, the cover plate abuts against the handle 2, the insert block 321 is snap connected to the limit groove 42, and the snap rib 31 is stuck in the snap-in groove portion 412 stably.

Referring to FIG. 6, the telescopic assembly includes a telescopic member 324 and an unlocking member 325.

The telescopic member 324 has a telescopic function, and is connected between the insert block 321 and the handle 2. The insert block 321 can be further provided with a shallow groove 3212 for the telescopic member 324 to abut against, the depth of which is less than or equal to the length of the telescopic member 324. The handle 2 can be further provided with a flat plate 33 for telescopic member 324 to abut against. The shallow groove 3212 and the flat plate 33 enable the telescopic member 324 to be positioned between the insert block 321 and the handle 2 stably. In this embodiment, the telescopic member 324 can be a restoring spring 82, which endows the insert block 321 with a tendency of moving away from the flat plate 33.

Figure 7:
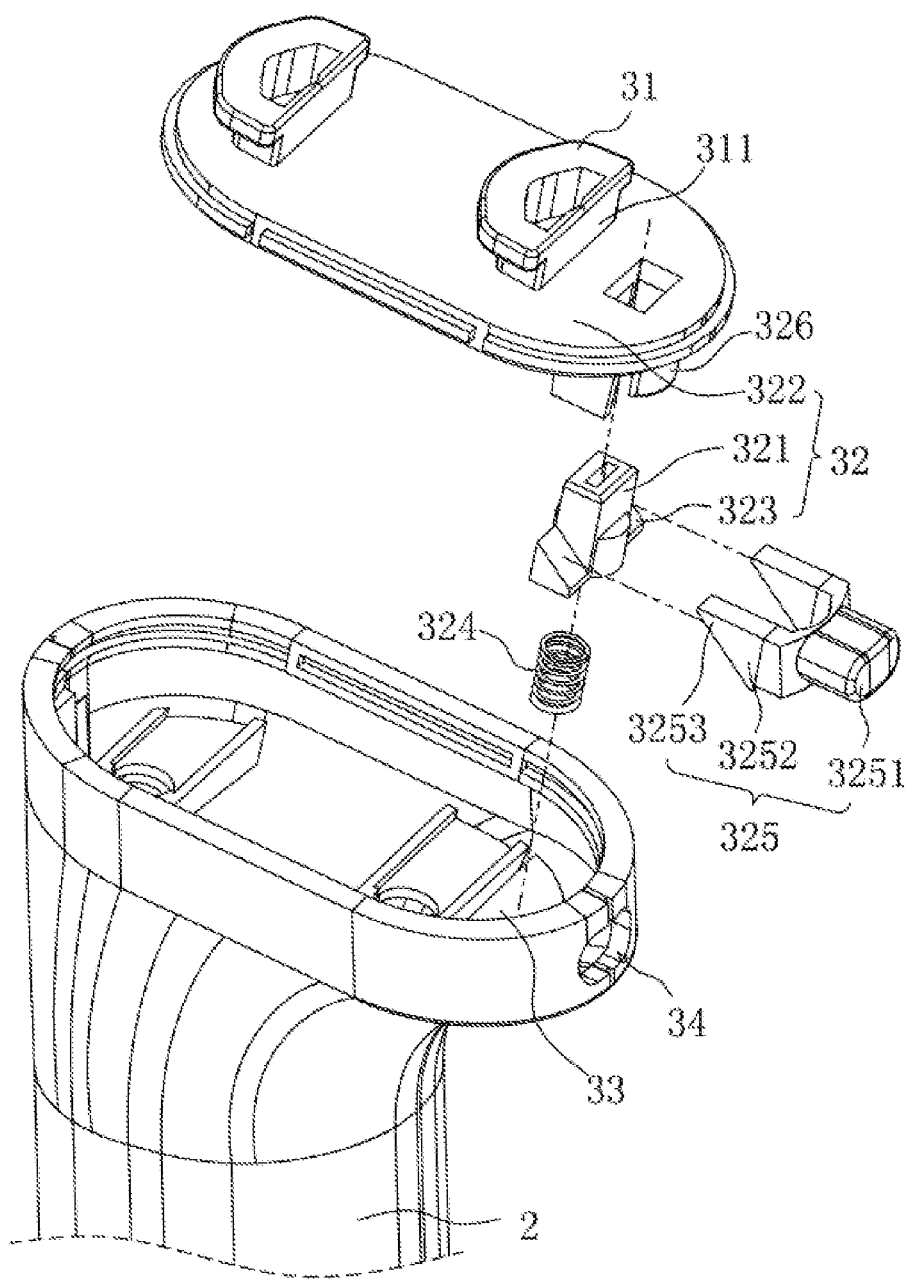
FIG. 7 is an exploded schematic diagram of the handle in Embodiment 1 of the present application.

Referring to FIG. 6 and FIG. 7, the unlocking member 325 is a wedge member. The unlocking member 325 is in inserted between the limit slider 323 and the cover plate 322, including an unlocking part 3251, a first abutting part 3252 and a second abutting part 3253. The first abutting part 3252 and second abutting part 3253 is of the same number as that of the limit sliders 323.

The unlocking part 3251 is located at one side of the unlocking member 325, and the end of the handle 2 is provided with an unlocking hole 34 for the unlocking part 3251 to pass through. A portion of the unlocking part 3251 is exposed to the unlocking hole 34, and the unlocking member 325 can be moved by pressing the unlocking part 3251, so that the first abutting part 3252 and the second abutting part 3253 intermittently abut against the limit slider 323.

The second abutting part 3253 is located at the other side of the unlocking member 325, and the first abutting part 3252 is located between the second abutting part 3253 and the unlocking part 3251. One side of the first abutting part 3252 and one side of the second abutting part 3253 close to the limit slider 323 constitutes an unlocking slope by smooth connection with each other.

Referring to FIG. 6, a side of the limit slider 323 abutting against the unlocking slope is a slider slope abutting against the unlocking slope. A length of the unlocking slope along a tilting direction is larger than a length of the slider slope along the tilting direction. In this way, a first distance between the limit slider 323 and the cover plate when the first abutting part 3252 abuts against the limit slider 323 is larger than a second distance between the limit slider 323 and the cover plate 322 when the second abutting part 3253 abuts against the limit slider 323.

Pressing the unlocking part 3251 can drive the first abutting part 3252 to move to abut against the limit slider 323, so that the limit slider 323 drive the side of the insert block 321 provided with the snap rib 31 and facing away from the cover plate 322 to move, retracting the insert block 321 gradually into the guide hole 3221 while compressing the spring 324.

When loosening the unlocking part 3251, the telescopic member 324 forces the limit slider 323 to move with the insert block 321 toward the side of the cover plate 322 provided with the snap rib 31, so that the side of the insert block 321 away from the limit slider 323 is gradually exposed out of the guide hole 3221, meanwhile, the slider slope of the limit slider 323 pushes the first abutting 3252 and the second abutting part 3253 to move toward the unlocking hole 34, so as to automatically restore the unlocking member 325.

Figure 8:
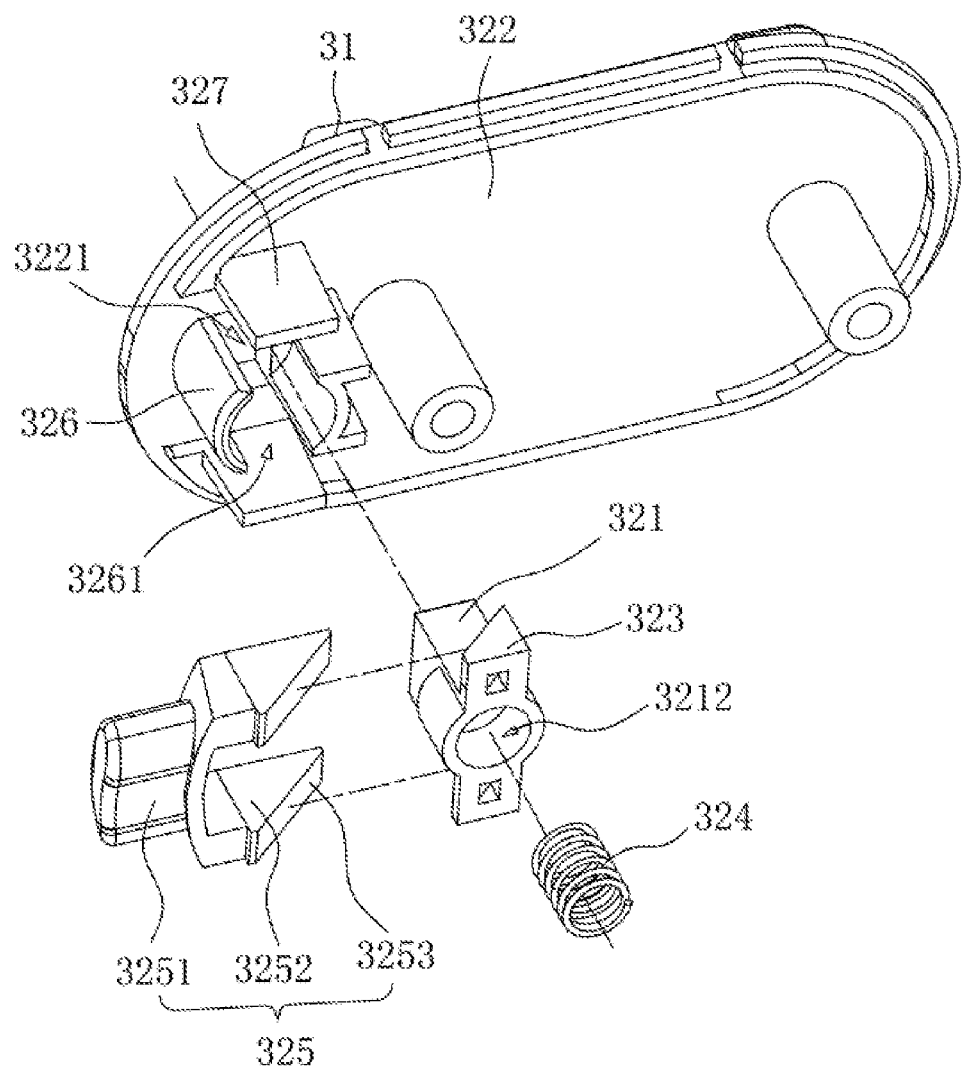
FIG. 8 is an exploded schematic diagram of a cover plate and a limit mechanism in Embodiment 1 of the present application.

Referring to FIG. 7 and FIG. 8, a side of the cover plate 322 close to the limit slider 323 is coaxially provided with a guide tube 326. The guide tube 326 is provided with a limit guide groove 3261 for slidingly mounting the limit slider 323, the side of the limit slider 323 away from insert block 321 extends toward the outside of the limit guide groove 3261 to abut against the unlocking member 325. The cover plate 322 is fixed with a side stop block 327 located at a peripheral side of the guide tube 326. For use, the limit slider 323 is slid along the limit guide groove 3261, and the first abutting part 3252 and the second abutting part 3253 are positioned between the guide tube 326 and the side stop block 327, therefore, the side stop block 327 is cooperated with the guide tube 326 to reduce the possibility of circumferential rotation of the unlocking member 325 around the guide 326.

For installing the handle 2, the snap rib 31 is firstly inserted into the accommodation groove portion 411 of the snap-in groove 41 in the propeller body 1. Since the insert block 321 is not aligned with the limit groove 42, the snap rib 31 is forced to retract into the guide hole 3221. Then the handle 2 is moved to snap connect the snap rib 31 with the snap-in groove portion 412, so that the insert block 321 is aligned with one of the accommodation groove portion 411 of the snap-in groove 41, and moved toward the propeller body 1 to abut against the accommodation groove portion 411 under the action of the telescopic member 324 in the telescopic assembly, therefore, the snap rib 31 is restricted from disengaging from the snap-in groove 41, achieving a stable installing of the handle 2 on the propeller body 1.

For removing the handle 2, the unlocking member 325 is firstly pressed to urge the limit slider 323 to disengage the insert block 321 from the propeller body 1. Then the handle 2 is pushed to drive the snap rib 31 to move from the snap-in groove portion 412 to the accommodation groove portion 411 of the snap-in groove 41. Then the handle 2 is controlled to disengage the snap rib 31 from the snap-in groove 41, realizing the separation of the handle 2 from the propeller body 1.

Figure 9:
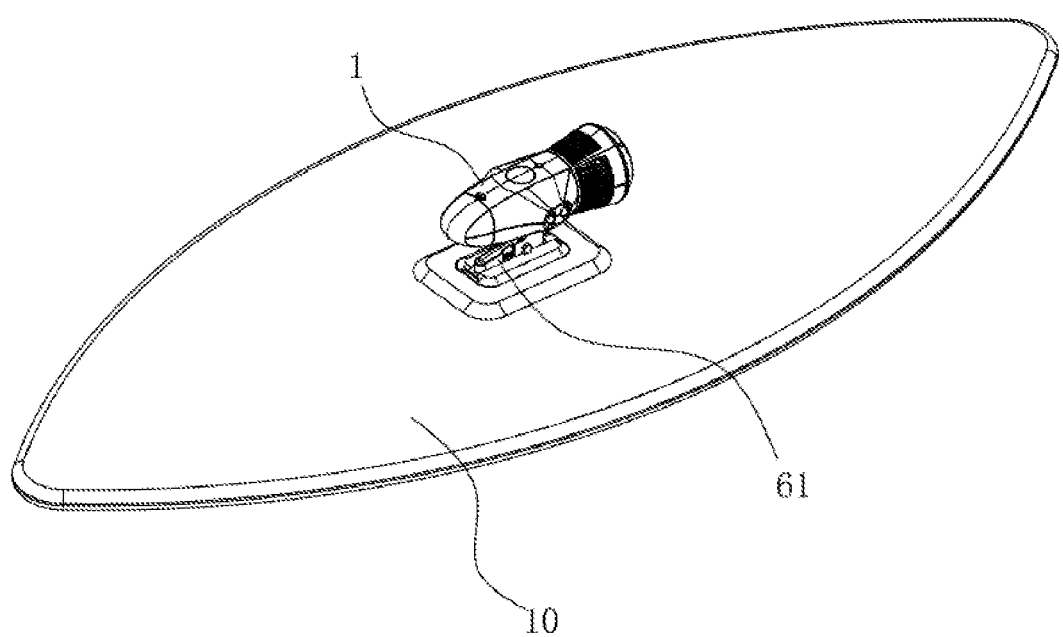
FIG. 9 is a schematic diagram of Embodiment 1 of the present application connected with an external equipment.
Figure 10:
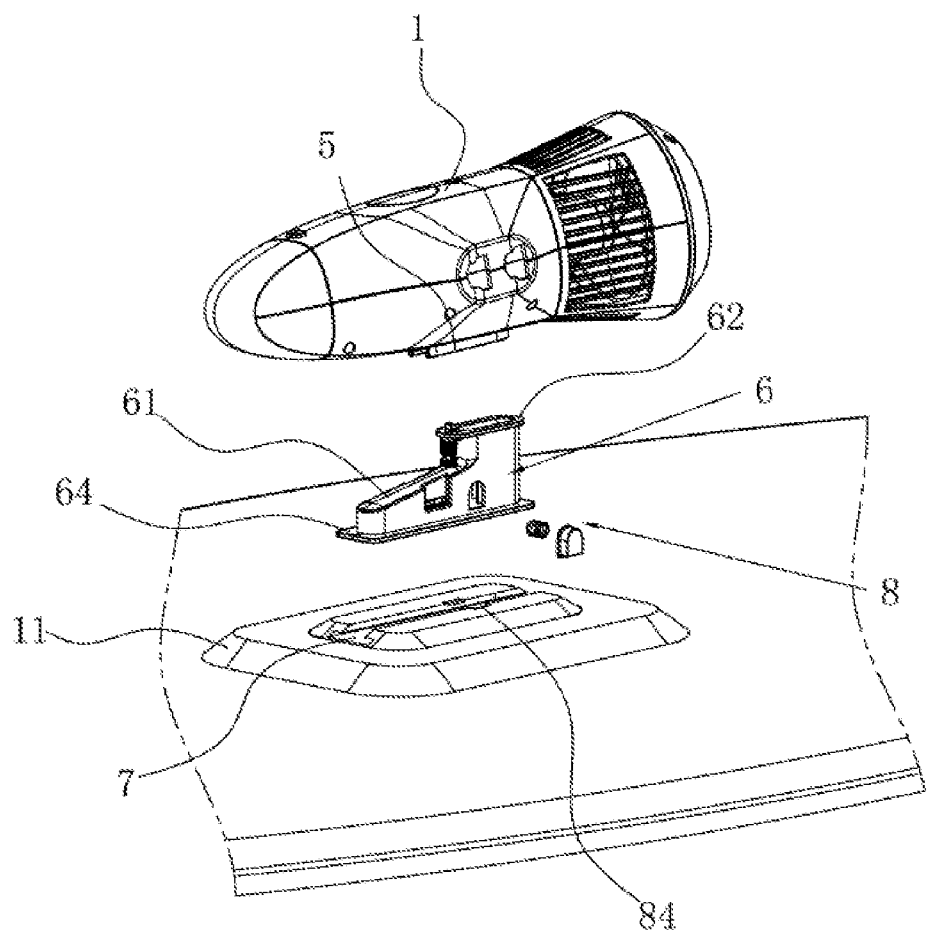
FIG. 10 is a exploded schematic diagram of Embodiment 1 of the present application connected with an external equipment.

Referring to FIG. 9 and FIG. 10, the propeller body 1 can be further provided with external equipment 10. An outer surface of the propeller body 1 is provided with a adapter structure. The adapter structure includes a sliding rail 5 integrally formed at the bottom of the propeller body 1, in which the slide rail 5 has a cross section of an inner cavity of T shape. The adapter structure further includes a connecting piece 6 provided at the slide rail 5 and connected to the external equipment 10. The external equipment 10 can be connected to the outer surface of the propeller body 1 in plug-in connection via the slide rail 5 and the connecting piece 6.

Figure 11:
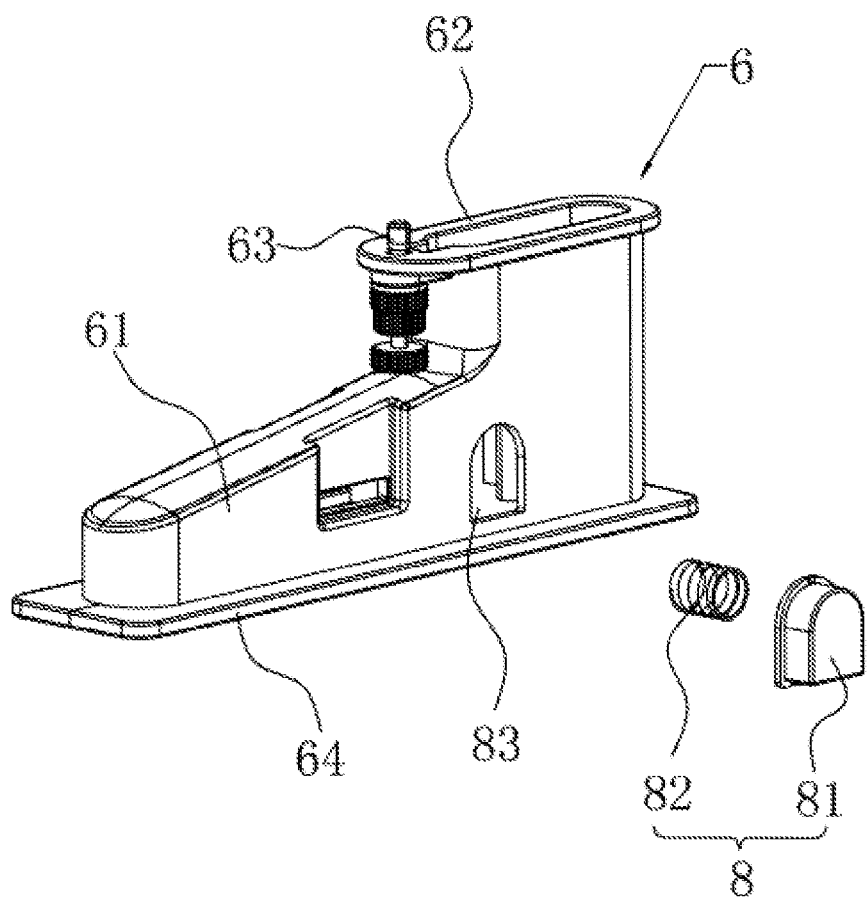
FIG. 11 is a exploded schematic diagram of a connecting block and a snap-connection assembly in Embodiment 1 of the present application.

Referring to FIG. 10 and FIG. 11, the connecting piece 6 includes a connecting block 61, the end of the block 61 is integrally formed with a first insertion plate 62, and the first insertion plate 62 is inserted the inner cavity of the slide rail 5. An outer wall of the first insertion plate 62 is threadedly connected with a locking bolt 63, and the locking bolt 63 is in thread connection with the outer surface of the propeller body 1. Providing the locking bolt improves the connecting stability between the first insertion plate 62 and the slide rail 5. An end of the connecting block 61 away from the first insertion plate 62 and the external equipment 10 are fixed to each other by means of detachable connection.

Referring to FIG. 10, the external equipment 10 can be a kayak or surfboard. When the external equipment 10 is a surf board, the user removes the handle 2 in advance, and installs the surf board on the outer surface of the propeller body 1, so that the user can stand on the surf board and slide on the water. During use, the propeller body 1 is under the water, the user stands on the surf board and operates remotely with the handle 2 to realize surfing.

Referring to FIG. 10 and FIG. 11, when the external device 10 is a surf board, the surf board is provided with a boss 11 in the middle, and a side of the boss 11 facing away from the surf board is provided with a connecting groove 7 along with its length direction. The connecting groove 7 is communicated with the other end of the boss 11, so that both ends of the connecting groove 7 are communicated with the outside. The connecting groove 7 has a T-shaped cross-section. A side of the connecting block 61 away from the first insertion plate 62 is fixed with a second insertion plate 64, with a width of the second insertion plate 64 being larger than a width of the connecting block 61. The second insertion plate 64 is inserted in the connecting groove 7.

Referring to FIG. 10 and FIG. 11, the connecting block 61 is further provided with a snap-connection assembly 8 driving the second insertion plate 64 to be fixed in the connecting groove 7 by means of pressing to snap in.

The snap-connection assembly 8 includes two abutting blocks 81 respectively arranged on two sides of the connecting block 61 and a spring 82 A limit hole 83 is provided penetrating through a side wall of the connecting block 61, the two abutting blocks 81 are respectively in sliding connection with the two ends of the limit hole 83, the spring 82 is located in an inner cavity of the limit hole 83, and one end of the spring 82 is fixed on one of the abutting blocks 81, and the other end is fixed on the other abutting block 81. During the process of sliding the second insertion plate 64 into the connecting groove 7, two abutting blocks 81 are pressed to compress the spring 82, and a side wall of the abutting block 81 is flush with a side wall of the connecting block 61, then the second insertion plate 64 can be slid into the connecting groove 7.

Referring to FIG. 10 and FIG. 11, two side walls of the connecting groove 7 are provided with a snap-in groove 84, which is communicated with the connecting groove 7. During the process of sliding the second insertion plate 64 into the connecting groove 7, when the limit hole 83 is aligned with the snap-in groove 84, the user looses the abutting block 81, so that the abutting block 81 is slid into the snap-in groove 84 and abuts against the inner wall of the snap-in groove 84 under a restoring force of the spring 82, thereby restricting the connecting block 61 from sliding along with a length direction of the connecting groove 7. A through hole for strap or rope to pass through is provided penetrating through a side wall of the connecting block 61, so that the user can pull the entire connecting block 61 by the rope.

In the Embodiment 1 of the present application, the implementation principle of the multifunctional underwater propeller is as follows. The second insertion plate 64 is inserted into the connecting groove 7 of the external equipment 10 in advance, and the abutting block 81 is pressed. When the limit hole 83 is aligned with the snap-in groove 84, the abutting block 81 is loosened, so that the abutting block 81 is fitted in the snap-in groove 84 under the force of the spring 82. Then an upper end of the first connecting block 61 is slid into a chute of the slide rail 5. The locking bolt 63 is rotated to threadedly connect it to the outer surface of the propeller body 1, realizing the connection between the external surf board and the propeller body 1.

Embodiment 2

Figure 12:
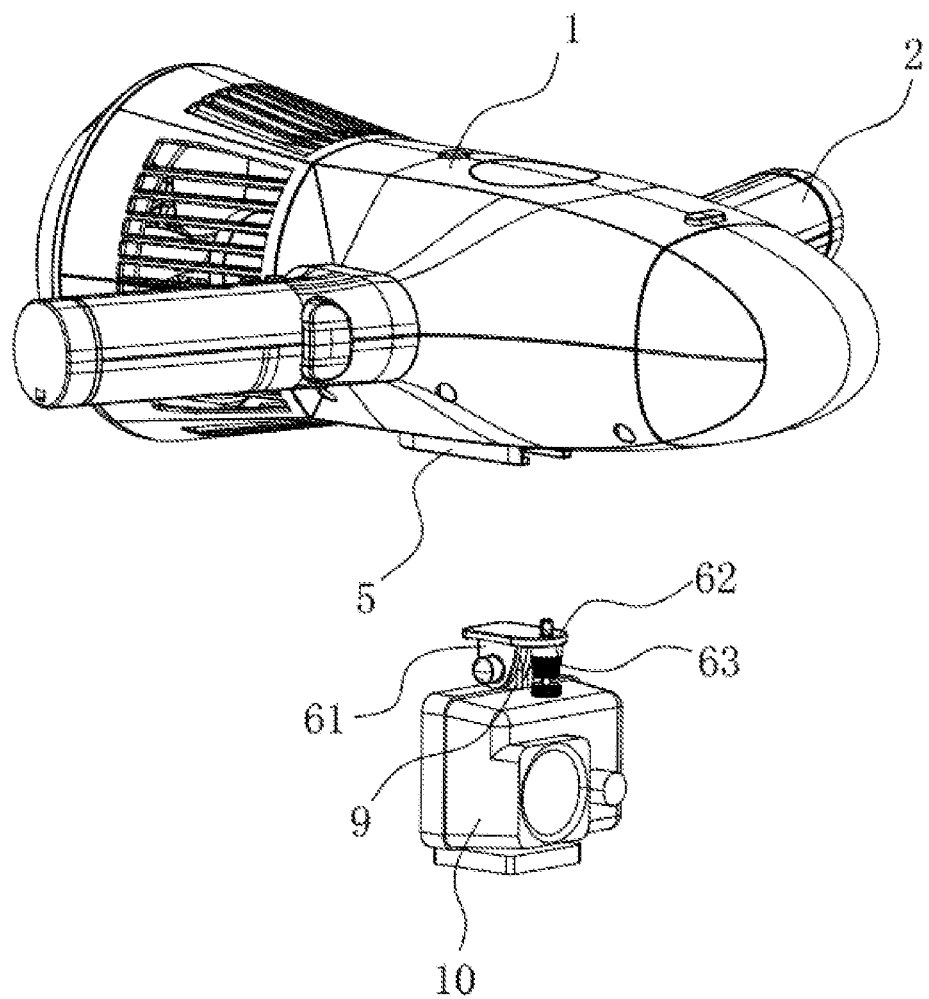
FIG. 12 is a schematic diagram of Embodiment 2 of the present application

Referring to FIG. 12, the difference between the Embodiment 1 and the Embodiment 2 is that: when there is no need for surf board, and the propeller body 1 is used alone for moving under water, the external equipment 10 is a camera that can be used under water. An outer side of the camera is provided with a connecting plate by means of screw fixation or bonding. The shape of the connecting block 61 in Embodiment 2 can be tailored according to the shape and size of the external equipment 10. The connecting plate is rotatably connected to an end of the connecting block 61 away from the first insertion plate 62 via a pin.

In the Embodiment 2 of the present application, the implementation principle of the multifunctional underwater propeller is as follows. For exploring and photographing under water, the handle 2 is installed on the outer surface of the propeller body 1, then the camera is connected to the outer side of the propeller body 1 by the connecting plate. When the user dives, he can hold the handle 2 to move under water, while taking photos and exploring under water conditions.

The above are the preferred embodiments of the present application, and do not limit the protection scope of the present application. Therefore, all equivalent changes made according to the structure, shape and principle of the present application should be covered by the protection scope of the present application.

What is claimed is:

1. A multifunctional underwater propeller comprising a propeller body, wherein an outer surface of the propeller body is detachably connected with a handle, a side wall of the propeller body is connected with an adapter structure for detachably connecting external equipment, the adapter structure comprises a slide rail fixed on the outer surface of the propeller body and a connecting piece provided between the slide rail and the external equipment, the connecting piece is in plug-in connection with the slide rail and configured for detachably connecting the external equipment, the connecting piece comprises a connecting block and a first insertion plate fixed to one end of the connecting block, the first insertion plate is fixed to an inner cavity of the slide rail by plug-in connection, a second end of the connecting block is configured for detachably connecting the external equipment, when the external equipment is fixed with the connecting block by plug-in connection, a connecting groove is provided at one side of the external equipment, a second insertion plate is fixed at one end of the connecting block away from the propeller body, the second insertion plate is slidingly movable in the connecting groove, a snap-connection assembly is provided at the one end of the connecting block away from the propeller body for fixing the second insertion plate in the connecting groove, the snap-connection assembly comprises a first abutting block arranged on one side of the connecting block, a second abutting block arranged on another side of the connecting block and a spring arranged between the first abutting block and the second abutting block, a limit hole is provided penetrating through a side wall of the connecting block, the first abutting block and the second abutting block are respectively slidingly connected at two ends of the limit hole, a snap-in groove is defined in a side wall of the connecting groove and in communication with an inner cavity of the connecting groove, and the first abutting block and the second abutting block abut against an inner wall of the snap-in groove.

2. The multifunctional underwater propeller according to claim 1, wherein the first insertion plate is threadedly connected with a locking bolt, and the locking bolt is threadedly connected with an outer wall of the propeller body.

3. The multifunctional underwater propeller according to claim 1, wherein the connecting block is a hinge, a connecting plate is fixed on a side wall of the external equipment, and one end of the connecting block away from the propeller body is hinged with the connecting plate.

4. The multifunctional underwater propeller according to claim 1, wherein the propeller body comprises a circuit board, a drive motor electrically connected to the circuit board, and a spiral blade coaxially fixed on a rotating shaft of the drive motor, the handle is provided with a button for controlling start and stop of the drive motor, and the button is electrically connected with the circuit board.

5. The multifunctional underwater propeller according to claim 1, wherein one end of the handle is provided with an outwardly protruded snap rib, an outer side of the propeller body is provided with a second snap-in groove cooperating with the outwardly protruded snap rib to connect the propeller body with the handle, one of the propeller body or the handle is connected with a limit mechanism, and the other of the propeller body or the handle is provided with a limit groove cooperating with the limit mechanism to force the snap rib to be engaged with the second snap-in groove; and the limit mechanism includes an insert block matching with the limit groove and a telescopic assembly driving the insert block to be inserted into or separated from the limit groove.

6. The multifunctional underwater propeller according to claim 5, wherein the limit mechanism further comprises a cover plate fixed on the propeller body or the handle provided with the limit mechanism;

the cover plate is provided with a guide hole for one side of the insert block to pass through, and an outer peripheral surface of a second side of the insert block is convexly provided with a limit slider for restricting the insert block from disengaging from the guide hole;

the telescopic assembly includes a telescopic member forcing the insert block to pass through the guide hole and an unlocking member forcing the insert block to retract into the guide hole; and one end of the telescopic member abuts against the insert block, and a second end of the telescopic member abuts against the propeller body or the handle;

the unlocking member is positioned between the cover plate and the propeller body or the handle provided with the limit mechanism; and the unlocking member includes an unlocking part, a first abutting part and a second abutting part, the first abutting part and the second abutting part are controlled by the unlocking part to abut against the limit slider alternatively, and a first distance between the limit slider and the cover plate when the first abutting part abuts against the limit slider is larger than a second distance between the limit slider and the cover plate when the second abutting part abuts against the limit slider.

7. The multifunctional underwater propeller according to claim 6, wherein the unlocking part is located at one side of the unlocking member, and the handle is provided with an unlocking hole for the unlocking part to pass through; the second abutting part is positioned on a second side of the unlocking part, and the first abutting part is positioned between the second abutting part and the unlocking part; and one side of the first abutting part and one side of the second abutting part abutting against the limit slider together constitute an unlocking slope, and the unlocking slope is tilted from the first abutting part to the second abutting part and from the limit slider to the cover plate; and the limit slider is provided with a slider slope abutting against the unlocking slope, and a length of the unlocking slope along a tilting direction is larger than a length of the slider slope along the tilting direction.

8. A multifunctional underwater propeller comprising a propeller body, wherein an outer surface of the propeller body is detachably connected with a handle, a side wall of the propeller body is connected with an adapter structure for detachably connecting external equipment, the adapter structure comprises a slide rail fixed on the outer surface of the propeller body and a connecting piece provided between the slide rail and the external equipment, the connecting piece is in plug-in connection with the slide rail and configured for detachably connecting the external equipment, the connecting piece comprises a connecting block and a first insertion plate fixed to one end of the connecting block, the first insertion plate is fixed to an inner cavity of the slide rail by plug-in connection, a second end of the connecting block is configured for detachably connecting the external equipment, the connecting block is a hinge, a connecting plate is fixed on a side wall of the external equipment, and one end of the connecting block away from the propeller body is hinged with the connecting plate.

9. A multifunctional underwater propeller comprising a propeller body, wherein an outer surface of the propeller body is detachably connected with a handle, a side wall of the propeller body is connected with an adapter structure for detachably connecting external equipment, the adapter structure comprises a slide rail fixed on the outer surface of the propeller body and a connecting piece provided between the slide rail and the external equipment, the connecting piece is in plug-in connection with the slide rail and configured for detachably connecting the external equipment, one end of the handle is provided with an outwardly protruded snap rib, an outer side of the propeller body is provided with a snap-in groove cooperating with the outwardly protruded snap rib to connect the propeller body with the handle, one of the propeller body or the handle is connected with a limit mechanism, and the other of the propeller body or the handle is provided with a limit groove cooperating with the limit mechanism to force the snap rib to be engaged with the snap-in groove; and the limit mechanism includes an insert block matching with the limit groove and a telescopic assembly driving the insert block to be inserted into or separated from the limit groove.

* * * * *